US006178503B1

(12) United States Patent
Madden et al.

(10) Patent No.: US 6,178,503 B1
(45) Date of Patent: Jan. 23, 2001

(54) MANAGING MULTIPLE OPERATING SYSTEMS ON A SINGLE COMPUTER

(75) Inventors: Paul E Madden; Jasper C Pan; Robert S Raymond, all of Orem, UT (US)

(73) Assignee: PowerQuest Corporation, Orem, UT (US)

( * ) Notice: Under 35 U.S.C. 154(b), the term of this patent shall be extended for 0 days.

(21) Appl. No.: 09/152,222

(22) Filed: Sep. 11, 1998

(51) Int. Cl.[7] .............................. G06F 15/77; G06F 1/24; G06F 3/00
(52) U.S. Cl. .................................. 713/2; 713/100; 710/8
(58) Field of Search ................................. 713/1, 2, 100, 713/202; 707/100; 710/8; 702/225; 717/11; 709/220

(56) References Cited

U.S. PATENT DOCUMENTS

| | | | |
|---|---|---|---|
| 4,982,324 | 1/1991 | McConaughy et al. | 364/200 |
| 5,134,580 | 7/1992 | Bertram et al. | 395/650 |
| 5,136,711 | 8/1992 | Hugard et al. | 395/700 |
| 5,214,695 | 5/1993 | Arnold et al. | 380/4 |
| 5,278,973 * | 1/1994 | O'Brien | 713/2 |
| 5,307,497 | 4/1994 | Feigenbaum et al. | 395/700 |
| 5,319,384 | 6/1994 | Isenberg et al. | 345/145 |
| 5,361,358 | 11/1994 | Cox et al. | 395/700 |
| 5,497,455 * | 3/1996 | Suga | 395/159 |
| 5,548,703 * | 8/1996 | Berry | 395/160 |
| 5,572,641 * | 11/1996 | Kuo | 395/140 |
| 5,615,347 * | 3/1997 | Davis | 395/349 |
| 5,627,964 * | 5/1997 | Reynolds | 714/2 |
| 5,673,403 * | 9/1997 | Brown | 713/2 |
| 5,711,672 | 1/1998 | Redford et al. | 434/307 R |
| 5,713,024 * | 1/1998 | Halladay | 717/11 |
| 5,715,456 | 2/1998 | Bennett et al. | 395/652 |
| 5,797,139 * | 8/1998 | Amro | 707/100 |
| 5,832,298 * | 11/1998 | Sanchez | 710/8 |
| 5,838,383 * | 11/1998 | Chimoto | 348/553 |
| 5,860,001 | 1/1999 | Cromer et al. | 395/651 |
| 5,887,163 * | 3/1999 | Nguyen | 713/2 |
| 5,898,435 * | 4/1999 | Nagahara | 345/352 |
| 5,951,687 * | 9/1999 | Chan | 713/2 |
| 5,956,515 * | 9/1999 | Beals | 395/712 |
| 5,974,547 * | 10/1999 | Klimenko | 713/2 |
| 6,047,373 * | 4/2000 | Hall | 713/1 |

OTHER PUBLICATIONS

"Partition–It Product Page", QUARTERDECK, no Later than Sep. 29, 1998, pp. 1–2.
"SEARCH '97 Information Server V3.0.1 Document, Search Results", QUARTERDECK, 1998, pp. 1–2.
"System Commander Special Edition For Windows 98, Upgrade to Windows® 98 without losing Windows 95 or 3.1–Automatically!", Sep. 10, 1998, pp. 1–4.
"System Commander® Deluxe, The safest and easiest way to add a new operating system. Guaranteed!", V Communications, Jul. 9, 1998, pp. 1–3.
"System Commander®, Run multiple operating systems on one PC!", V Communications, Jun. 17, 1998, pp. 1–5.
A. Shulman, "Go Anywhere and Do Anything with 32–bit Virtual Device Drivers for Windows™", Microsoft Systems Journal, Oct. 1992, pp. 1–11.
M. Bradley, "Open Boot Firmware", Sun Microsystems Computer Corporation, Winter '92, pp. 1–13.

* cited by examiner

Primary Examiner—Robert W. Beausoliel, Jr.
Assistant Examiner—Willie Martin
(74) Attorney, Agent, or Firm—Computer Law ++

(57) ABSTRACT

The invention addresses the management of multiple operating systems on a single computer and other boot-time problems. A boot-time graphical user interface is described, including support for menus, tabs, non-ASCII characters, and other graphical user interface components in the pre-boot environment. Approaches to organizing the storage and selection of multiple operating system are also presented, including the use of multiple directories which are identified in operating system boot sectors.

15 Claims, 5 Drawing Sheets

MANAGING MULTIPLE OPERATING SYSTEMS ON A SINGLE COMPUTER

FIELD OF THE INVENTION

The present invention relates generally to the management of multiple operating systems which are present simultaneously on the permanent storage of a given computer, and more particularly to the organization of operating systems and the selection of one operating system using a boot-time graphical user interface.

TECHNICAL BACKGROUND

A variety of options are available when booting Microsoft's Windows 95/98 operating systems (WINDOWS 95 and WINDOWS 98 are marks of Microsoft Corporation). A standard computer configured with one of these operating systems can present the user with a list of choices for booting the operating system. However, to reach that menu of choices one must remember to press the F8 key at the proper time (when the "Starting Windows 95" or "Starting Windows 98" message appears). After one presses the F8 key properly, the computer presents a menu and one can then press a number to make a selection. Typical selections include possibilities such as Normal, Logged, Safe Mode, Safe Mode with Network Support, Step-by-Step Confirmation, Command Prompt Only, Safe Mode Command Prompt, and Previous Version Of DOS. The previous version of DOS menu option will boot the version of DOS that was installed before the installation of Windows 95/98; this option allows users to access their old DOS as well as Windows 95/98. Unless indicated otherwise, "DOS" includes MS-DOS, PC-DOS, DR-DOS, Novell DOS (marks of their respective owners), and similar operating systems, and "Windows" includes Windows 3.x, Windows 95, Windows 98, and Windows NT (marks of Microsoft Corporation).

If one adds the Microsoft Windows NT operating system to a computer, then a Windows NT menu is also added, so one can select Windows NT, Windows NT VGA Mode or Windows 95/98 (WINDOWS NT is a mark of Microsoft Corporation). By going through two menus one can access three operating systems: Windows NT in two different modes (Normal and VGA mode), Windows 95/98 in several different modes, and DOS. "NT" is used here as an abbreviation of "Windows NT operating system," just as "Windows 98" in used to abbreviate "Windows 98 operating system" and so on with other operating systems.

If one adds the OS/2 operating system, one often also installs the IBM Boot Manager program which allows a selection to be made at boot-time between OS/2 and previously installed operating systems (OS/2 and BOOT MANAGER are marks of IBM). But this means that in order to boot DOS, one must load the NT boot menu from Boot Manager, then from the NT boot menu choose Windows 95/98, then hit the F8 key when the "Starting Windows 95" or "Starting Windows 98" message appears, and finally, press the key that corresponds to the number of the option for "Previous DOS." Then the original DOS will boot.

In addition, the Boot Manager menu has a time-out. If one delays too long, Boot Manager boots according to a default choice. The NT menu also has a time-out, after which it boots NT. A user may have only a two-second window in which to hit the F8 key to get the six options presented by Windows 95/98.

In response to this boot option complexity, boot management programs have been developed to let users select between various operating systems and operating system modes in a less complex way at boot-time. Like other programs, boot management programs can benefit from user familiarity with graphical user interface mechanisms such as cursors and menus.

However, there is little support for graphical user interface ("GUI") operations at boot-time before an operating system comes up. Operations that would be straight-forward after booting, such as generating and displaying graphical lines, pictures, and fonts, are often much harder at boot-time because the operating system and standard graphics programs and libraries are not available. A boot-time application is often solely responsible for providing menus or other graphics components.

Supporting fonts poses a particular challenge. Rendering fonts can be difficult, especially when multiple language versions of the software are required. In particular, challenges are posed by non-ASCII character sets, including double-byte character sets such as Japanese, Chinese, Korean, Arabic, and Hebrew.

In response to the lack of support for fonts, menus, and other GUI components at boot-time, some boot-time interfaces simply run in text mode without any attempt at graphics. Other interfaces use custom fonts while still in text mode. However, in text mode a given character has only two associated colors, namely, a foreground color and a background color. A mouse cursor may be provided, but it is generally shown either by blinking the character at the cursor's present location or by limited color changes using the available background and foreground colors. In general, text mode interfaces are less flexible and powerful than graphical user interfaces.

Boot management programs provide several examples of attempts to create something resembling a graphical user interface at boot-time. One version of the Boot Manager program uses a character-oriented display at boot-time rather than a graphical user interface. The program must do, in the limited boot-time environment, all the work necessary to display custom fonts to support languages such as Japanese and other non-ASCII character sets.

One version of a program from V Communications, Inc. known as "System Commander" apparently uses a text mode but defines custom characters to give the appearance of a simple GUI. This program is limited because it actually runs in text mode rather than graphics mode.

System Commander does reduce boot option complexity but could also be improved in that respect. System Commander may be used instead of Boot Manager to select an operating system to boot. System Commander also allows more than one operating system to be installed in a single partition on a hard drive. The ability to select from multiple operating systems stored in a single partition eliminates the need to boot the Windows NT menu to get to Windows 95/98 and then to DOS. For instance, to boot Windows NT in VGA mode one goes through System Commander and the Windows NT menu; to boot Windows 95 Safe Mode one goes through System Commander and then presses the F8 key to get a menu and then chooses Safe Mode. To boot a previous version of DOS one simply goes through System Commander. Although System Commander reduces the complexity, however, one still must deal with multiple menus and varied selection mechanisms such as entering a number or pressing a function key.

One version of a program from Quarterdeck Corporation known as "Select-It" apparently loads a DOS kernel, and then runs a graphical user interface. Select-It apparently uses a third party graphics library to display graphics, line boxes, and so on, and to render fonts. The library used apparently does not provide for common GUI objects such as push buttons, menus, and text controls; all of these would need to be implemented separately. A graphics library of this type may be large in size and often requires significant amounts of memory.

Select-It does reduce boot option complexity but could also be improved in that respect. Select-It may be used instead of Boot Manager to select an operating system to io boot. Select-It allows one to have either Windows 95 or Windows 98 in a given partition and use menu items to boot the operating system in several different modes; multiple operating systems are apparently stored in separate subdirectories in the partition. However, to get access to some of the other modes one must press the F8 key to get a menu and then choose the menu item for the desired mode. Full support for Windows NT is also lacking.

Thus, it would be an advance to further reduce boot option complexity by presenting a simpler and more uniform interface, supported by an appropriate organization of multiple operating systems.

It would also be an advance to provide improved support for graphical user interfaces at boot-time.

Such improvements are described and claimed below.

BRIEF SUMMARY OF THE INVENTION

The present invention provides improved capabilities for managing multiple operating systems in a single computer and performing other boot-time operations. For instance, the present invention provides boot-time graphical user interface support that could be used in embedded systems or personal digital assistants, in debugging not-yet-booted or partially booted systems, and other environments that provide very limited graphics support. Boot management is discussed in detail as an example, but other uses of these novel boot-time graphics capabilities also lie within the scope of the invention.

Boot management includes organizing operating systems and allowing users to select which operating system to boot. The multiple operating systems are stored simultaneously on one or more hard disks or other permanent storage devices. The permanent storage devices are either attached to or accessible (e.g., via a network) to the computer to be booted. Because there are more operating systems than the computer can boot and run at one time, a user must select between operating systems at boot-time.

Before an operating system is booted and running, there is little or no support for a graphical user interface. Accordingly, one aspect of the present invention provides improved boot-time support for graphical user interfaces. This involves pre-rendering menu options and other graphical components to bitmaps before boot-time and then displaying various bitmap combinations to provide a boot-time GUI. The graphics components may include text in ASCII or non-ASCII fonts.

One beneficial embodiment of the invention is a boot-management software program which provides users with the option of using a single menu for all available operating systems and operating system modes. The single menu can be used to replace or hide selection clutter which requires steps such as highlighting a menu item with the arrow keys, pressing the Enter key, highlighting an item in a second menu, pressing the Enter key again, pressing the F8 function key at the correct time, and so on. The boot-time graphical user interface and other features allow the boot-management software to present users with a simple and uniform interface for selecting the operating system and operating system mode to be booted.

Mechanisms are also provided for organizing the manner in which the multiple operating systems are stored on the hard disk(s), and for preparing the computer to run once an operating system and mode are selected. According to one aspect of the invention, multiple operating systems are stored in one partition but kept in separate directories or separate directory subtrees. Necessary parts of the selected operating system are then copied to the root directory or other location at which the boot loader seeks the operating system being booted. Accessory files are likewise copied as necessary to allow the selected operating system to function properly.

One boot-management software program which implements the invention eliminates the steps of booting Windows 95 from the Windows NT menu and booting DOS from the Windows 95 menu. Instead, each of those operating systems is added to one uniform menu presented by a boot-time graphical user interface. A user may then boot Windows NT, Windows 95 and DOS from the same menu instead of going through several menus and steps and remembering special key strokes.

In one embodiment, the user may add an operating system to the menu more than once at configuration time. In particular, users may add several Windows NT menu items while specifying different modes for running Windows NT. During a subsequent boot, a boot-time graphical user interface component such as an auxiliary menu allows the user to choose from the previously specified modes using menu items such as Normal Boot Mode, VGA Boot Mode, and Previous Operating System (usually DOS or Windows 95). The user may also choose to boot using the conventional Windows NT menu.

Other features and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

One aspect of the present invention provides boot-time graphical user interface support on a computer. One beneficial embodiment is a boot-management software program which provides users with a single menu for all available operating systems and operating system modes on a given computer. The boot-management program illustrates many aspects of the invention.

However, the boot-time graphical user interface support provided by the invention may also be used in other ways in boot management programs, and it may be used in boot-time programs other than boot management programs. For instance, the boot-time graphical user interface may be used in network communications, network administration, security, operating system and other software deployment, remote site management, diagnostic, storage device management, or anti-viral programs which run at boot-time. It may also be used in "regular" applications that run in a limited-graphics-support environment such as a portable device or an embedded system.

Definition of "Boot-Time"

The terms "boot-time" and "configuration time" used here should be understood in view of the following comments. When a computer is reset or powered on, a ROM bootstrap routine runs. The ROM bootstrap routine is usually stored in ROM, but may also be stored in flash memory or another device. The starting address for the ROM bootstrap routine is hard-coded in the machine, so the processor always begins execution with the first instruction stored at that address. The ROM bootstrap routine reads a disk bootstrap program from the first sector of the disk, loads it into RAM, and passes control to it. The disk bootstrap program in turn either directly or indirectly reads an operating system off the disk into memory and gives it control. Finally, the operating system command interpreter passes control to application programs as they are invoked.

As used here, "boot-time" is the window of time after the first instruction of the ROM bootstrap routine begins to execute and before an operating system has been loaded. A ROM BIOS is not considered part of the operating system for purposes of this definition. "Configuration time" is the rather longer window of time after the operating system has received control and before another reset or power interruption.

General System Environment

Figure 1:
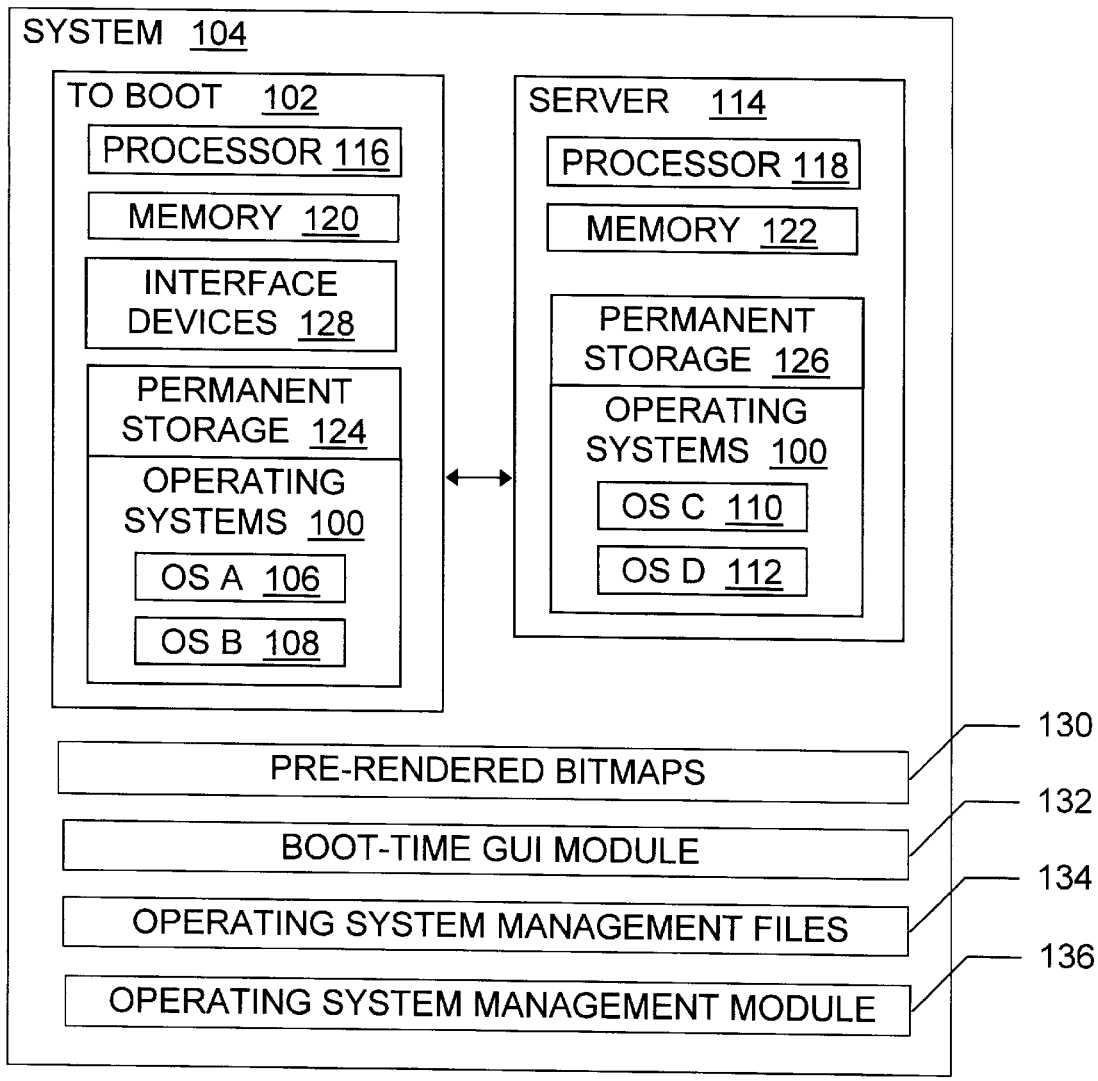
FIG. 1 is a diagram illustrating a system which implements the present invention.

One embodiment of the present invention is a system for managing multiple operating systems 100 on a computer to be booted 102, such as the system 104 shown in FIG. 1. For ease of illustration, only four operating systems 106, 108, 110, 112, and one computer to be booted 102 are shown, but the system 104 may generally manage one or more operating systems 100 for one or more computers to be booted.

The system 104 includes at least the computer to be booted 102 and optionally includes a server computer 114. Each of the computers 102, 114 has a processor 116, 118 for executing instructions, and a memory 120, 122 (such as random access memory) for storing instructions, respectively. In the illustrated system, each computer 102, 114 also has permanent storage devices 124, 126, respectively, for holding operating systems 100 and other code and data. In an alternative embodiment, the computer to be booted 102 has no local permanent storage 124. Suitable storage devices 124, 126 include one or more non-volatile storage devices such as magnetic or optical disk drives, ROM, bubble or flash memory or battery-backed memory. The computer to be booted 102 has interface devices 128 such as a mouse or keyboard, as well as a monitor, panel, screen, or other pixel-based display.

The computers 102, 114 may also be capable of using floppy drives, tape drives, optical drives or other means to read a removable storage medium such as floppy disks, removable hard disks, tape, CD-ROMs, PROMs, memory modules, and other computer system storage devices. Each memory 120, 122 and storage device or medium can be written and read by execution of appropriate instructions using the respective processor 116, 118.

The computers 102, 114 may be connected by a network, modems, or other familiar means. One or both of the computers 102, 114 may be a server connected by network signal lines to one or more network clients, or it may be a network client, or it may be a standalone machine. The signal lines may include twisted pair, coaxial, or optical fiber cables, telephone lines, satellites, microwave relays, modulated AC power lines, RF connections, and/or other data transmission "wires" known to those of skill in the art. A server computer may be configured as an Internet server, as an intranet server, as a name server, as a file server, as an applications server, or as a combination thereof. A given computer 102, 114 may also function both as a client and as a server; this may occur, for instance, on computers running Microsoft Windows NT software.

Each of the processors 116, 118 may be a uniprocessor, a multiprocessor, or clustered processor machine(s). Suitable computers 102, 114 include, without limitation, personal computers; laptops, personal digital assistants, and other mobile devices; and workstations. Although particular computer system 104 components are identified herein, those of skill in the art will appreciate that the present invention also works with a variety of other systems.

Boot-Time Graphical Support

One embodiment of the invention uses previously rendered graphical bitmap files 130 that are displayed at boot-time, making it unnecessary for a boot-time program to render fonts and draw all graphical items itself at boot-time. Embodiments may use existing graphics file formats or custom graphics file formats in the files 130. One embodiment uses the existing format of a Windows Bitmap file using RLE4 compression with sixteen colors. However, virtually any graphics file format could be used, including custom file formats.

Some embodiments are designed to use a VGA graphics display 128 but other display types can also be used. One boot-time GUI implementation 132 of the invention first identifies a way to display individual pixels to the display 128. One way to do this on "Wintel" systems is BIOS graphics pixel display calls (INT 10h function 0Ch).

Another method, used in one embodiment, is to write directly to the VGA graphics card ports and memory to display the pixels. This method allows the embodiment 132 to more rapidly display the pixels, and therefore the bitmaps 130. However, it does change the graphics card display mode through a BIOS call (INT 10h function 00h) rather than changing the graphics display mode using the video card hardware. Since this call is only made once at the beginning and then once at the end to restore the original video mode (the original mode gotten by calling INT 10h function 0F), possible performance reduction is not a major concern.

The method uses direct hardware access to change the hardware write mode to write mode #2; that mode is used because it allows for faster pixel plotting. The method changes between hardware write modes #2 and #0 so that the mouse driver will display the mouse pointer correctly. When displaying bitmaps 130, the mouse pointer is turned off through mouse driver call INT 33h function 0002h. The embodiment 132 then switches to hardware write mode #2 to display the bitmap 130, then switches back to hardware write mode #0, then turns the mouse pointer back on through mouse driver call INT 33h function 0001h.

Each time before it displays a bitmap 130, the embodiment 132 waits for the start of a vertical retrace before beginning the display operation, in order to limit flicker on the screen 128. Also, note that Windows RLE4 bitmaps 130 are stored with the bottom line of the bitmap 130 first in the file. Accordingly, the embodiment 132 flips the bitmap 130 upside down before storing it to provide access to the first line first in the file, because displaying top to bottom on the screen 128 helps eliminate flicker.

Figure 2:
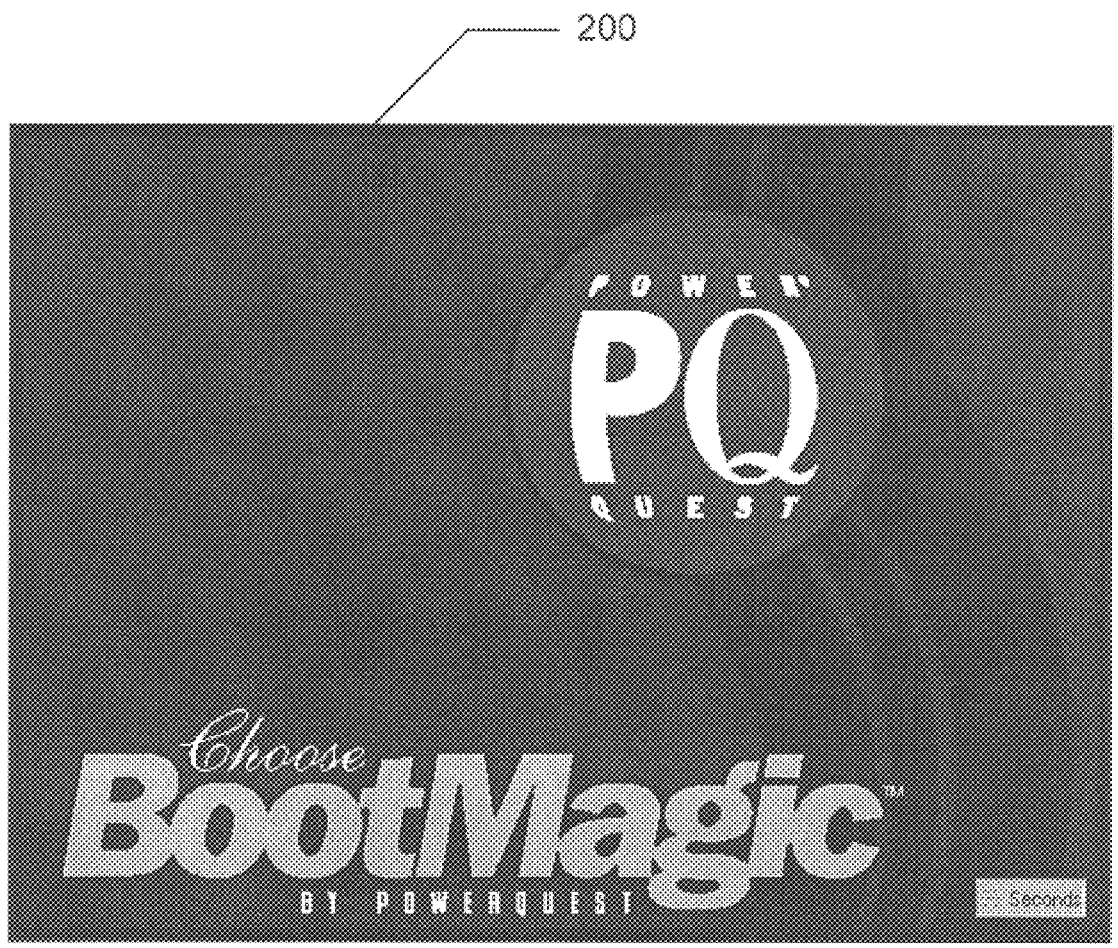
FIG. 2 illustrates a background bitmap suitable for use according to the present invention.

The first bitmap 130 used is a background bitmap; one suitable background bitmap 200 is illustrated in FIG. 2. The background bitmap 200 provides the base graphic for a visible portion of the graphical interface. According to the invention, one can generate a relatively complete background bitmap 200 using a paint program or other graphical configuration time program. This can be done while running a booted instance of DOS or Windows or another operating system on the computer 102 or another computer at configuration time, when relatively powerful support is available for creating graphics. One then uses the resulting pre-rendered bitmap 200 at a later boot-time.

Figure 3:
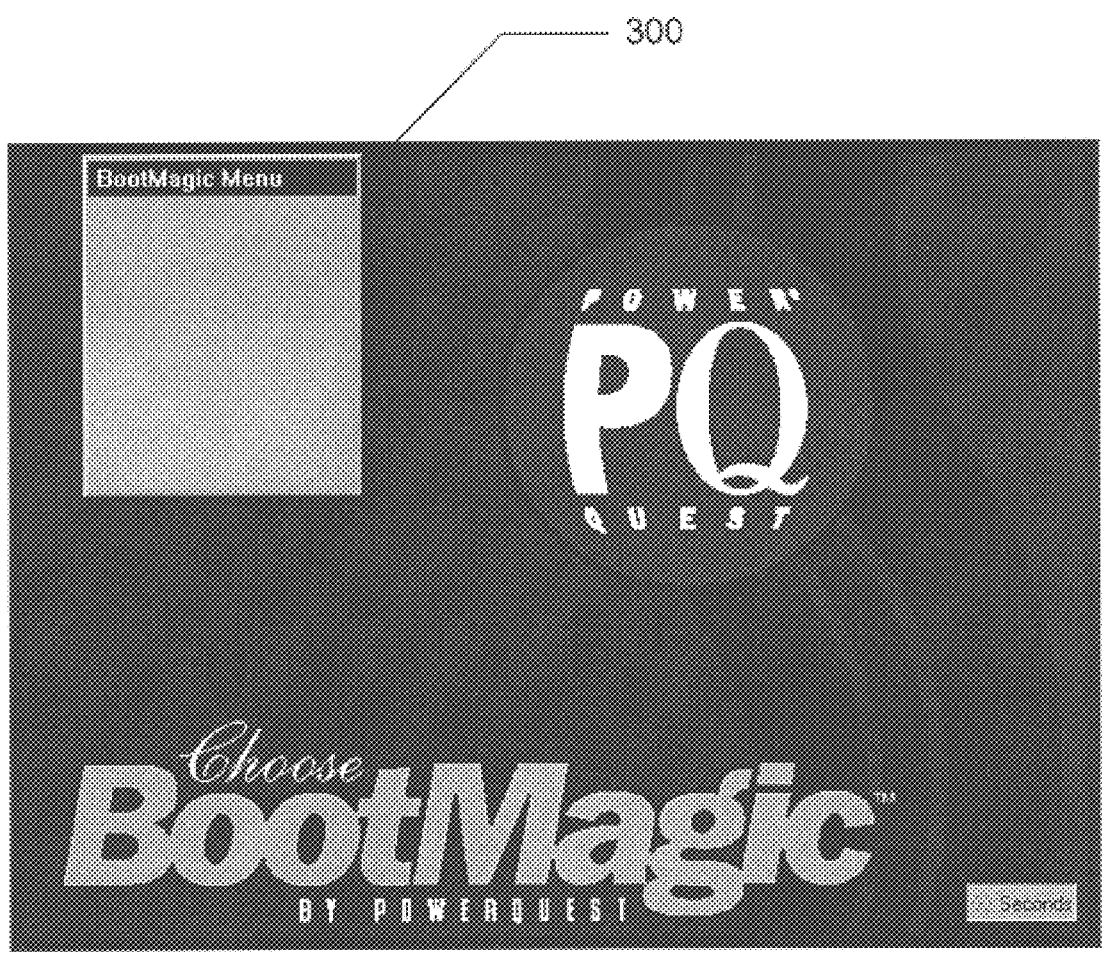
FIG. 3 illustrates the background bitmap of FIG. 2 combined with a menu bitmap according to the present invention.

When saving program settings in the configuration time program, one composes the base background bitmap 200 and a menu border bitmap; the menu border bitmap is based on the number of menu items to be presented in the GUI and their sizes. An example 300 of the combined menu border and background is shown in FIG. 3. This combination bitmap 300 is saved to a disk 124 for display at boot-time. Similar steps can be taken with other menu border bitmaps if multiple menus are needed.

Figure 4:
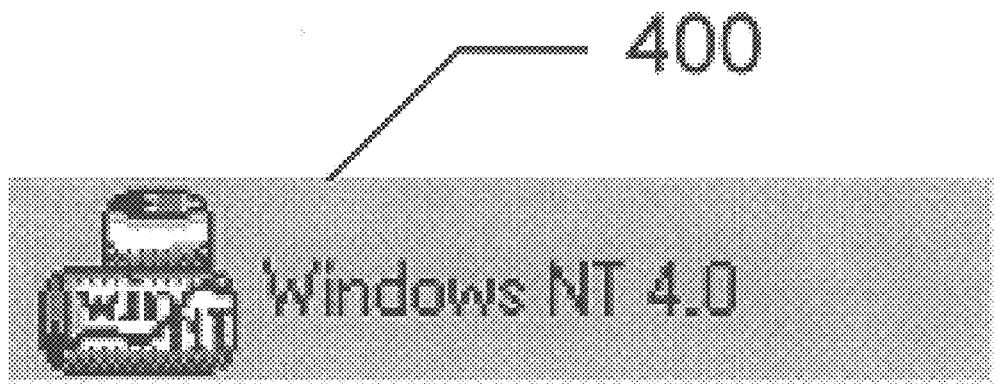
FIG. 4 illustrates a normal display menu item bitmap according to the present invention, for use when the corresponding menu item is not selected.
Figure 5:
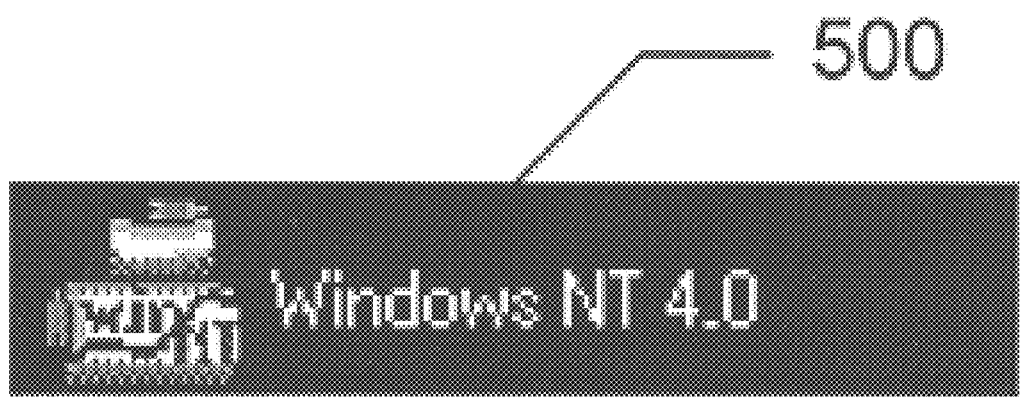
FIG. 5 illustrates a highlighted display menu item bitmap according to the present invention, for use when the corresponding menu item is selected.

As illustrated in FIGS. 4 and 5, each menu item is saved as two separate bitmaps. One bitmap is for the normal display of the menu item in the menu; an example of a normal display bitmap 400 is shown in FIG. 4. The other bitmap is for the selected or highlighted display of the menu item; an example highlighted display bitmap 500 is shown in FIG. 5.

To generate these bitmaps 400, 500 at configuration time, one method reads in a standard graphics component for the menu item and renders it onto a bitmap in memory 120 or 122 using any transparency information stored in the component. Suitable graphics component files include Windows resources, icon files, files such as *.BMP, *.GIF, *.PCX, and *.PNG files, and other familiar graphics component files in vector or bitmap formats. Suitable graphic components may also be read in using operating system calls or predefined handles to obtain predefined components such as standard hash patterns or standard dialog boxes.

This retrieval and rendering is done twice: once for the normal bitmap 400 and once for the selected bitmap 500. The memory based bitmap is one byte per pixel. One then takes a bitmap image of the menu item text that the user has entered from the screen 128 and copies it into the menu item bitmaps twice: once for the normal bitmap 400 and once for the selected bitmap 500, changing the colors as needed. In the bitmap image, if the text selected by a user is just two colors, one simply goes through the bitmap and replaces the two colors with colors of one's choice.

Under Windows, one can also use Windows Device Contexts and standard Windows GDI functions to read the graphic component and draw the text into the Device Context; one can then get the bitmap 400, 500 from the Device Context to write out to disk 124 (or 126). Regardless of the operating system being used at configuration time, one may generally use a combination of bitmaps produced and assembled by various methods to create pre-rendered bitmaps for use according to the invention.

Figure 6:
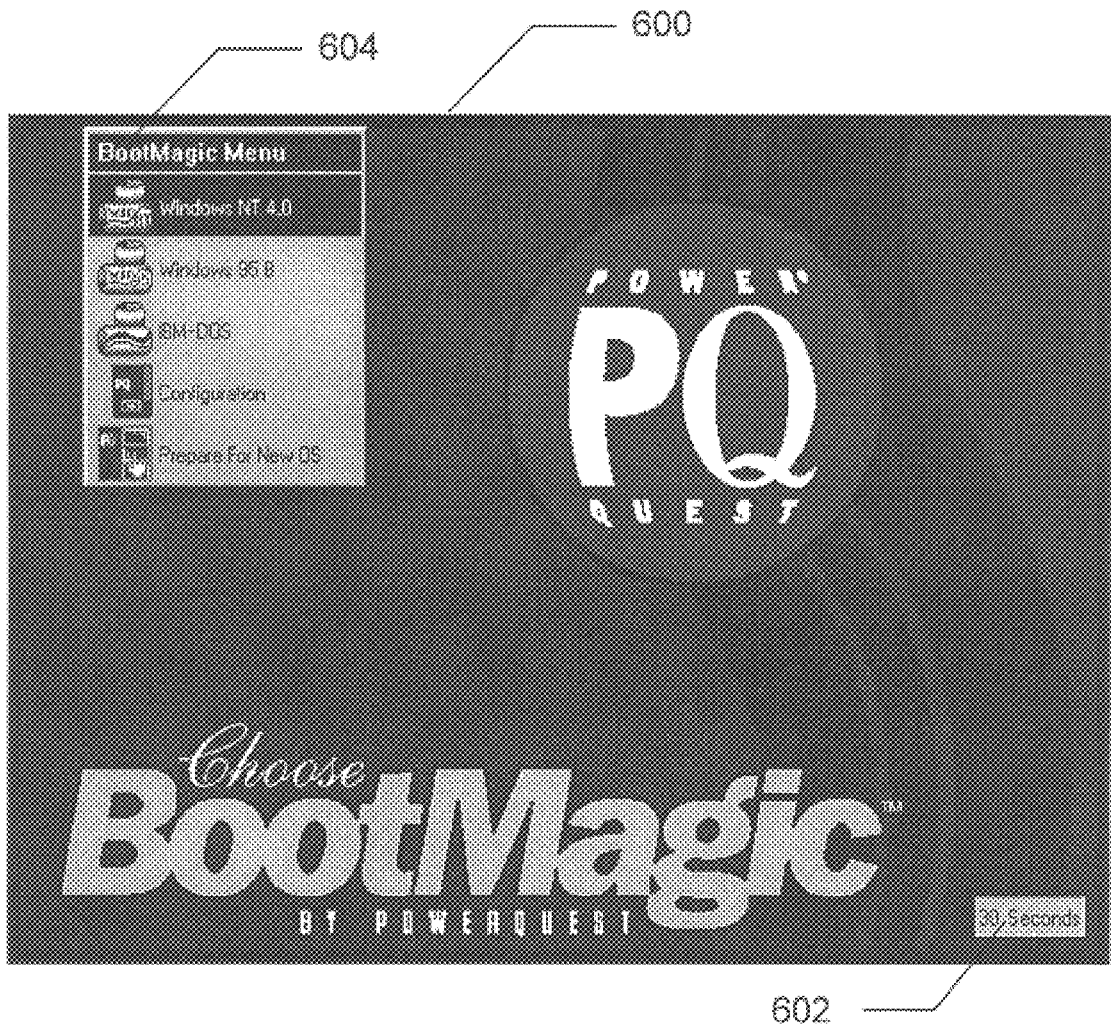
FIG. 6 illustrates the combined background and menu border bitmap of FIG. 3 in further combination according to the present invention with timer bitmaps, several normal display menu item bitmaps of the type shown in FIG. 4, and one highlighted display menu item bitmap of the type shown in FIG. 5.

At boot-time a program 132 or system 104 according to the invention loads the background bitmap 200, or the combination background and menu border bitmap 300. The implementing program or system then reads in all the menu item normal display bitmaps 400 and displays them, and finally displays the highlighted bitmap 500 for the currently selected menu item. An example of the resulting image 600 is shown in FIG. 6. As the user selects different menu items the embodiment 132 uses the appropriate normal display bitmap 400 to return the old selected menu item to a visibly non-selected state and then uses the newly selected menu item's selected bitmap 500 to show that the item has been selected.

In an alternative embodiment, the menu border and normal display menu item bitmaps (and possibly the background as well) are all combined in one bitmap 130, and user selections are indicated by XORing with another bitmap 130, changing color, or otherwise altering the portion of the bitmap 130 corresponding to the selected menu item.

The numerals "0" through "9" are pre-rendered and stored in small bitmap files 130 as well; those bitmaps 130 are used to display a timer 602 that will count down the number of seconds. If the timer 602 is stopped, the embodiment 132 covers up the timer section of the display 128 using a bitmap 130 that is just a solid color or another design a 2 that is shaped, sized, and colored to block out the timer or indicate visually that the timer 602 is stopped.

The present invention provides boot-time graphical user interface support with a very small amount of relatively simple code. Very little code is needed to display bitmaps. By using the fonts as rendered by the operating system and/or user interface shell and/or graphics or paint programs at configuration time (after a rendering system is booted and more powerful and complex support is present for creating graphics), the invention makes it unnecessary to render any fonts at boot-time, which would require significant code and data at boot-time. This makes it much easier to localize the boot-time piece 130, 132 for different alphabets and different languages.

Multiple Operating System Support

To support more than one operating system 100 in a given disk 124 partition, one embodiment breaks out the operating systems 100 into separate directories so that they can be booted individually. For example, a copy of Windows NT boot code and files may reside in one directory (or directory subtree) while a copy of OS/2 boot code and files resides in a second and a copy of DOS boot code and files resides in a third. When a given operating system 106, 108, 110, or 112 is selected, the operating system code and other files needed to run the selected operating system are copied by a boot management program 136 to the root directory or another location from which the selected operating system 100 can be loaded during booting.

Alternatively, or in combination with the use of separate directories for each operating system 100, an embodiment of the invention may include a user-editable text file 134 or other readily edited description listing the various operating system types and versions presently supported for the computer 102. One embodiment uses a btmagic.dat file 134 that indicates which operating systems 100 are available for use on the computer 102.

Employing the user-editable text file 134 to describe bootable operating systems and their modes to the boot management software 136 has several advantages. For instance, this makes it possible to upgrade certain capabilities of the system without requiring installation of an object code patch or new object code version by the user. Suppose a boot management program 136 currently supports a specific operating system residing on the computer system. When a new operating system is published (whether it be a new version of an existing operating system or an entirely new operating system), one can readily edit the file 134 to support the new operating system. Users with prototype or proprietary operating systems can also add them without assistance from the boot management software 136 vendor.

In particular, if the new operating system is an upgrade of a previously released operating system, then the invention facilitates a switch to the upgrade. For example, suppose the current operating system supports only the FAT16 file system format, while the upgrade supports both FAT16 and FAT32 formats. The boot management program 136 searches the hard drive for an installed FAT32 operating system, and/or monitors installations to detect the addition of a FAT32 operating system. When the FAT32 operating system is found, the boot management program 136 makes it the default in place of the FAT16 operating system, creating a FAT32 boot record if necessary.

Likewise, if the file system has been switched (through an upgrade or otherwise), the boot management program 136 can detect the switch and then boot the corresponding operating system and file system combination. For instance, if a file system is converted from FAT16 to FAT32 format (or vice versa), then the boot management program 136 detects the change and loads an operating system and file system that work with the new file system format. The format change may be detected by examining the partition table and/or file system structures.

Another advantage is the ability to list the same operating system multiple times in the file 134. This provides support for different operating system modes using switches, environment variables, or execution environment parameters, as well as support for different versions or instances of a given operating system.

A third advantage is the self-documenting nature of the file 134. Human-readable identifiers may be used to identify each installed operating system; comments may also be included. In one embodiment, the file 134 contains the information provided in a boot record such as OEM name and date, and the size of each supported operating system.

A fourth advantage is the ability to identify newly installed operating systems. If the OEM Name in the operating system boot record matches an entry in the file 134, then boot management software 136 creates a subdirectory to identify the operating system in question and stores the operating system boot code and files in that subdirectory. If no match is found, then the boot record list of system files, such as io.sys and msdos.sys, is compared with the file 134 list. If a match is found, then the OEM Name in the boot record is changed to match the OEM Name in the file 134. If no match is found, the the OEM Name in the boot record is set to PQ_ANYOS.

The boot management software 136 may also modify the OEM Name in the boot record to match the subdirectory name. This allows one to install multiple copies of the same operating system and/or multiple different operating systems in the same partition by assigning different subdirectory names. So long as OEM names correspond to subdirectory names, the number of installed operating systems is essentially limited only by the available disk space and the number of directory entries available. A keyword may also be placed in the file 134 to prevent the OEM name from being overwritten by the boot management program 136.

One suitable syntax for the file 134 is illustrated by the following:

```
;   @OEM MSDOS5.0   -> This is the OBM name extracted from the boot
;          record.
;
;   1              -> Indicate that it is a static file name, which means that the file
;                       must exist for the operating system to boot. Moreover, order
;                       counts - the files must appear in the root directory in the order
;                       shown. The file name must be accompanied by date and
;                       file size (hex).
;   2              -> Indicate that it is a dynamic file name.
;   3              -> Indicate that it is a directory name (limited to 8 bytes).
;   4              -> A configuration program uses this information to generate the menu
;                       items and options that are presented to the user at boot-time
;   5              ->If ":5" does not exist, then the file order is arranged
;                       according to ":1", otherwise, it needs to be arranged
;                       in the order of ":5". Files in ":5" are treated as
;                       ":2" while copying.
;   6              -> Delete all the files listed.
;   7              -> Rename file while copying. [Source, Destination]
;                       For example; AUTOEXBCBAT, AUTOEXECDOS
;   8              -> Move file to its subdirectory.
;   9              -> Change the boot record OEM name to match directory name.
;
;   Date Format         -> Month (00) - Day (00) - Year (0000)
;
;   4: Format           -> Version # **-> VERSION 1
;                     Empty Line **->
;                     --OS Type-- **-> --DOS--
;                     OS Name    **-> MSDOS 5.0
;                     Partition # **-> 00000000
;                     Used by Cfg **-> True/False
```

```
;               Used by Cfg **->
;               Used by Cfg **->
;               Extract DOS **-> True/False
;               Partition # **-> 1–4, Windows NT only (disk and partition identifier)
;
;    Note: Comments are only allowed at the beginning of the file.
;
;        For PQ_ANYOS, please make sure every directory name starts with
;        'PQANY', for example PQANYOS0, PQANYOS1
;
;    Example operating systems: MSDOS 5.0, MSDOS 6.22, MSDOS 6.2/V
;                    PCDOS 6.1, PCDOS 6.3, PCDOS 7.0, PCDOS J5.0/V (J5.02D/V)
;                    OPENDOS 7.01
```

Illustrative excerpts from a file 134 organized using this syntax are provided

```
@OEM MSWIN4.1
:1 IO SYS,05-11-1998,364B6
:1 COMMAND COM,05-11-1998,16EB8
:5 IO DOS
:5 MSDOS DOS
:5 COMMAND DOS
:5 BTMAGIC FAT
:2 DRVSPACEBIN
:2 DBLSPACEBIN
:2 AUTOEXECBAT
:2 AUTOEXECDOS
:2 BOOTLOG PRV
:2 BOOTLOG TXT
:2 CONFIG SYS
:2 CONFIG WIN
:2 CONFIG DOS
:2 DETLOG TXT
:2 DETLOG OLD
:2 MSDOS SYS
:2 MSDOS ---
:2 NETLOG TXT
:2 SETUPLOGTXT
:2 SUHDLOG DAT
:2 LOGO SYS
:2 SYSTEM 1ST
:2 CCPW40 REP
:3 WIN98000
:3 WIN98001
:3 WIN98002
:3 WIN98003
:3 WIN98004
:3 WIN98005
:3 WIN98006
:3 WIN98007
:3 WIN98008
:3 WIN98009
:9
:4 VERSION 1
:4
:4 --WIN98--
:4 Windows 98
:4 00000000
:4 False
:4
:4
:4 False
@OEM MSWIN4.1
:1 WINBOOT SYS,05-11-1998,36416
:1 COMMAND W40,05-11-1998,16EB8
:5 BTMAGIC FAT
:2 DRVSPACEBIN
:2 DBLSPACEBIN
:2 IO SYS
:2 MSDOS SYS
:2 IBMBIO COM
:2 IBMDOS COM
:2 COMMAND COM
:2 BOOTLOG PRV
:2 BOOTLOG TXT
:2 DETLOG TXT
:2 LOGO SYS
:2WMSDOS ---
:2 NETLOG TXT
:2 SETUPLOGTXT
:2 SUHDLOG DAT
:2 SYSTEM 1ST
:7 AUTOEXECW40,AUTOEXECBAT
:7 AUTOEXECBAT,AUTOEXECDOS
:7 CONFIG W40,CONFIG SYS
:7 CONFIG SYS,CONFIG DOS
:7 CONFIG WIN,CONFIG WIN
:7 MSDOS W40,MSDOS SYS
:3 DELFILES
:6
@OEM MSWINDOS
:1 IO SYS,07-11-1995,367AC
:1 COMMAND COM,07-11-1995,16AC6
:2 DRVSPACEBIN
:2 DBLSPACEBIN
:2 AUTOEXECBAT
:2 CONFIG SYS
:2 MSDOS SYS
:3 W95DOS00
:3 W95DOS01
:3 W95DOS02
:3 W95DOS03
:3 W95DOS04
:9
:4 VERSION 1
:4
:4 --DOS--
:4 Win95 DOS
:4 00000000
:4 False
:4
:4
@OEM MSWINDOS
:1 IO SYS,08-24-1996,34734
:1 COMMAND COM,08-24-1996,16E74
:2 DRVSPACEBIN
:2 DBLSPACEBIN
:2 AUTOEXECBAT
```

```
:2 CONFIG SYS
:2 MSDOS SYS
:3 W95DOSB0
:3 W95DOSB1
:3 W95DOSB2
:3 W95DOSB3
:3 W95DOSB4
:9
:4 VERSION 1
:4
:4 --DOS--
:4 Win95 B DOS
:4 00000000
:4 False
:4
:4
@OEM MSWINDOS
:1 IO SYS,05-11-1998,364B6
:1 COMMAND COM,05-11-1998,16EB8
:2 DRVSPACEBIN
:2 DBLSPACEBIN
:2 AUTOEXECBAT
:2 CONFIG SYS
:2 MSDOS SYS
:3 W98DOS00
:3 W98DOS01
:3 W98DOS02
:3 W98DOS03
:3 W98DOS04
:9
:4 VERSION 1
:4
:4 --DOS--
:4 Win98 DOS
:4 00000000
:4 False
:4
:4
@OEM MSWIN4.0
:1 NTLDR,08-09-1996,26150
:1 NTDETECTCOM,08-09-1996,68B0
:5 IO SYS
:5 MSDOS SYS
:5 IBMBIO COM
:5 IBMDOS COM
:5 COMMAND COM
:2 WINA20 386
:2 AUTOEXECBAT
:2 CONFIG SYS
:2 NTBOOTDDSYS
:2 NTOSKRNLEXE
:2 BOOTSECTDOS
:2 BOOT INI
:2 BTMAGIC FAT
:3 NT40SRV0
:3 NT40SRV1
:3 NT40SRV2
:3 NT40SRV3
:3 NT40SRV4
:8 PAGEFILESYS
:9
:4 VERSION 1
:4
:4 --WINNT--
:4 WinNT 4.0 Server
:4 00000000
:4 False
:4
:4
:4
@OEM IBM 5.0
:1 IBMBIO COM,10-25-1991,8456
:1 IBMDOS COM,02-01-1993,97A2
:1 COMMAND COM,04-24-1993,F0A1
:2 $JPNHN16FNT
:2 $JPNHN19FNT
:2 $JPNZN16FNT
:2 $SYS1DICFNT
:2 $SYS1Z16FNT
:2 $SYS1Z24FNT
:2 CONFIG PS2
:2 AUTOEXECPS2
:2 AUTOEXECBAT
:2 CONFIG SYS
:3 PCDOSJ50
:3 PCDOSJ51
:3 PCDOSJ52
:3 PCDOSJ53
:3 PCDOSJ54
:9
:4 VERSION 1
:4
:4 --DOS--
:4 IBM PCDOS J5.0/V
:4 00000000
:4 False
:4
:4
@OEM OPENDOS7
:1 IBMBIO COM,01-23-1997,6CE8
:1 IBMDOS COM,01-23-1997,7581
:1 COMMAND COM,01-23-1997,D725
:2 OPENDOS 386
:2 AUTOEXECBAT
:2 CONFIG SYS
:3 OPDOS700
:3 OPDOS701
:3 OPDOS702
:3 OPDOS703
:3 OPDOS704
:9
:4 VERSION 1
:4
:4 --DOS--
:4 Caldera DOS 7.01
:4 00000000
:4 False
:4
:4
@OEM IBM 20.0
:1 OS2KRNL ,04-05-1995,87CCA
:1 OS2LDR,01-10-1995,7600
:1 OS2LDR MSG,1 1-09-1994,20AE
:1 OS2DUMP,01-10-1995,2FDB
:2 OS2VER
:2 OS2BOOT
:2 OS2LOGO
:2 README 1ST
:2 CDFS IFS
:2 OS!2_WAR
:2 STARTUP CMD
:2 AUTOEXECBAT
:2 CONFIG SYS
:8 EA DATA SF
```

:8 WP ROOT SF
:3 WARP3000
:3 WARP3001
:3 WARP3002
:3 WARP3003
:3 WARP3004
:3 WARP3005
:3 WARP3006
:3 WARP3007
:3 WARP3008
:3 WARP3009
:9
:4 VERSION 1
:4
:4 --OS2--
:4 IBM OS/2 WARP 3
:4 00000000
:4 False
:4
:4
@OEM GMSWIN40
:5 IO SYS
:5 MSDOS SYS
:5 IBMBIO COM
:5 IBMDOS COM
:5 COMMAND COM
:5 BTMAGIC FAT
:2 NTLDR
:2 NTDETECTCOM
:2 WINA20 386
:2 AUTOEXECBAT
:2 CONFIG SYS
:2NTBOOTDDSYS
:2 NTOSKRNLEXE
:2 BOOTSECTDOS
:2 BOOT INI
:3 WINTGEN0
:3 WINTGEN1
:3 WINTGEN2
:3 WINTGEN3
:3 WINTGEN4
:3 WINTGEN5
:3 WINTGEN6
:3 WINTGEN7
:3 WINTGEN8
:3 WINTGEN9
:8 PAGEFILESYS
:9
:4 VERSION 1
:4
:4 --WINNT--
:4 Windows NT
:4 00000000
:4 False
:4
:4
:4
@OEM GMSWIN41
:5 IO DOS
:5 MSDOS DOS
:5 COMMAND DOS
:5 BTMAGIC FAT
:2 IO SYS
:2 COMMAND COM
:2 DRVSPACEBIN
:2 DBLSPACEBIN
:2 AUTOEXECBAT :2 AUTOEXECDOS
:2 BOOTLOG PRV
:2 BOOTLOG TXT
:2 CONFIG SYS
:2 CONFIG WIN
:2 CONFIG DOS
:2 DETLOG TXT
:2 DETLOG OLD
:2 MSDOS SYS
:2 MSDOS ---
:2 NETLOG TXT
:2 SETUPLOGTXT
:2 SUHDLOG DAT
:2 SYSTEM 1ST
:2 CCPW40 REP
:3 W9XGEN00
:3 W9XGEN01
:3 W9XGEN02
:3 W9XGEN03
:3 W9XGEN04
:3 W9XGEN05
:3 W9XGEN06
:3 W9XGEN07
:3 W9XGEN08
:3 W9XGEN09
:9
:4 VERSION 1
:4
:4 --WIN95--
:4 Windows 95/98
:4 00000000
:4 False
:4
:4
:4 False
@OEM PQ_ANYOS
:3 PQANYOS0
:3 PQANYOS1
:3 PQANYOS2
:3 PQANYOS3
:3 PQANYOS4
:3 PQANYOS5
:3 PQANYOS6
:3 PQANYOS7
:3 PQANYOS8
:3 PQANYOS9
:3 PQANYOSA
:3 PQANYOSB
:3 PQANYOSC
:3 PQANYOSD
:3 PQANYOSE
:3 PQANYOSF
:3 PQANYOSG
:3 PQANYOSH
:3 PQANYOSI
:3 PQANYOSJ
:3 PQANYOSK
:3 PQANYOSL
:3 PQANYOSM
:3 PQANYOSN
:3 PQANYOSO
:3 PQANYOSP
:9
:4 VERSION 1
:4
:4 --BACKUP--
:4 Unidentified OS :4 00000000
:4 False
:4
:4
@END Optimizations can be performed to reduce or avoid the need to copy large amounts of code and data to another directory each time a different operating system is booted. For instance, the copy can be avoided if the boot code and files are already in the root directory. Files used by an operating system but not needed to boot the operating system need not be copied, such as files in a subdirectory or the root directory which are only used by one operating system.

Instead of copying files, the boot management program 136 may also simply move file entries, thereby effectively moving files from one directory to another, such as from the subdirectory corresponding to a particular operating system to the root directory or vice versa. Moving file entries requires knowledge of the directory system structures, but this is readily available, and this method of moving files is generally much faster than a standard file copy operation. The entries are moved before any operating system (or accompanying file system) is booted, so there is no risk of inconsistencies between the operating system or file system view of the disk and the actual disk contents.

Note that the subdirectory containing an operating system's boot code and files need not be on the computer 102 being booted, but may instead be accessible through a low-level network connection if the network drivers are running and available to the boot management program 136 prior to booting. For instance, one method of the invention transfers operating system boot code and boot files to the computer 102 being booted over a network signal line; this can be done either before or after an operating system has been loaded on the computer 102's permanent storage 124. The computer 102 is then booted with the downloaded boot code and files. Error detection and correction protocols familiar in the art, such as checksums and retransmissions, can be used to ensure that the downloaded boot code and files are correct and complete.

EXAMPLE

Single Boot Menu

One embodiment of the invention includes boot management support files 134 and the boot management program 136. The boot management program 136 can obtain an operating system boot option selection from the user without presenting the user with multiple selection mechanisms such as arrow keys, the Enter key, function keys, and menu numbers (indicated by numeric keys). The boot management program 136 hides this inconsistent tangle of selection mechanisms. By using key stuffing and other techniques, the boot management program 136 presents the user instead with a single selection mechanism in the form of a single menu (such as a menu 604) for all of the operating systems and operating system modes available on a given computer 102.

The invention allows one to eliminate the steps of booting Windows 95 from the NT menu and booting DOS from the Windows 95 menu. Instead, each of those operating systems 100 can be added to a boot management program menu such as the menu 604. This eliminates several steps, including Boot Manager interaction, because all operating systems 100 can be booted using a BootMagic program 136 or other embodiment of the invention (BootMagic is a mark of PowerQuest Corporation for boot management software generally). This allows one to boot Windows NT, Windows 95/98 and DOS from the same menu 604 instead of going through several menus and steps and remembering special key strokes.

One embodiment also allows the user to add an operating system 100 to the menu 604 more than once. Users can associate different boot modes with the different entries for a given operating system 100 such as Windows NT. A tab for the properties of Windows NT menu items allows the user to select between Normal Boot mode, VGA boot mode, previous operating system (usually DOS or Windows 95), and the NT menu.

The NT boot.ini file 134 is modified for each option as suggested by the following example:

[boot loader]
timeout=10
default=multi(0)disk(0)rdisk(0)partition(1)\WINNT
[operating systems]
multi(0)disk(0)rdisk(0)partition(1)\WINNT="Windows NT Workstation Version 4.00"
multi(0)disk(0)rdisk(0)partition(1)\WINNT="Windows NT Workstation Version 4.00 [VGA mode]"/basevideo /sos
C:\="Microsoft Windows"

The default line specifies which operating system 100 will boot when the timer 602 times out. Notice that there are two lines in the operating systems section that match the default setting; when this occurs NT will boot the first item that matches. The first operating system 100 is a standard boot of Windows NT 4.0, and the second is a boot of windows NT 4.0 in VGA mode, (notice the /basevideo and /sos switches). The final operating system 100 in the list is "Microsoft Windows" which is either Windows 95 or Windows 98.

Entries in the boot.ini file may be added, removed, reordered, or modified using switches and other command line parameters. For instance, to boot NT in normal mode without displaying the NT menu, set the time-out value to zero. To boot NT in VGA mode set the time-out value to zero, then move the VGA mode operating system line to the first position in the list. To boot the previous operating system, which in this case is "Microsoft Windows", change the time-out line to zero and set the default line to "C:\". To boot NT using the NT menu, leave the boot.ini file 134 unmodified.

However, the boot.ini file 134 is not a substitute for the user-editable text file 134 describing operating systems because boot.ini does not describe the files needed to boot the operating systems.

When using the NT boot menu, one could specify the time-out value and also the default operating system 100 to boot if the time-out occurs. This would require changing the default line to the default operating system 100 and setting the timer value to the user selected value, and if the default was to be one of the operating systems 100 with the same default value, then one also moves the default to the head of the list.

To boot Windows 95 and Windows 98 in various modes, those of skill in the art will appreciate that operating system boot option changes may also be performed by modifying the familiar msdos.sys text file 134 in a manner analogous to the boot.ini file 134 modifications just described.

To boot Windows 95/98 in its different modes one embodiment has a Windows 95 options tab that lets the user specify the mode to boot. If the mode is normal at boot-time then the boot management program 136 lets Windows 95/98 boot as usual. If one of the other modes is chosen, then the boot management program 136 takes the number of that mode in the menu, and fills the keystroke buffer in computer 102 memory so it looks to Windows 95/98 as if the user pressed first the F8 key, then the number of the menu selection, then the Enter key; accordingly, that selection will be booted by Windows 95/98. This eliminates the need for the user to remember to press F8 and then choose the bootmode.

Tabs, dialogs, property pages, pop-up menus, pull-down menus, scroll bars, radio buttons, push buttons, check boxes, and other graphical user interface components can be implemented with bitmaps 130 in a manner similar to the implementation of the menu 604 discussed elsewhere herein. Those of skill in the art will readily understand the equivalence, with respect to the boot-time graphical user interface aspects 130, 132 of the present invention, of these and other GUI components. Thus, although specific reference is made to menus, other components may also be made and used according to the invention.

Articles of manufacture within the scope of the present invention include a computer-readable storage medium in combination with the specific physical configuration of a substrate of the computer-readable storage medium. The substrate configuration represents data and instructions which cause the computers 102, 114 to operate in a specific and predefined manner as described herein. Suitable storage devices include floppy disks, hard disks, tape, CD-ROMs, RAM, and other media readable by one or more of the computers. Each such medium tangibly embodies a program, functions, and/or instructions that are executable by the machines 102, 114 to perform substantially as described herein.

Although particular methods embodying the present invention are expressly illustrated and described herein, it will be appreciated that apparatus and article embodiments may be formed according to methods of the present invention. Unless otherwise expressly indicated, the description herein of methods of the present invention therefore extends to corresponding apparatus and articles, and the description of apparatus and articles of the present invention extends likewise to corresponding methods. Unless otherwise stated, any list of included items is exemplary, not exclusive of other items; "includes" means "comprises" not "consists of."

The invention may be embodied in other specific forms without departing from its essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A system for computer boot-time processing, comprising:
   a computer having a display, a processor, and a memory accessible to the processor for holding data and instructions being executed by the processor;
   pre-rendered graphical user interface component bitmaps; and
   a boot-time graphical user interface module which displays on the display combinations of at least two pre-rendered bitmaps at boot-time to reflect interactive user selections;
   wherein the system is a system for managing multiple operating systems on a computer to be booted, and the system further comprises a means for organizing the manner in which a plurality of operating systems are stored and booted.

2. The system of claim 1, wherein the means for organizing comprises a server computer which holds at least one operating system capable of running on the computer to be booted, and the server computer is connected to the computer to be booted by a network signal line.

3. The system of claim 1, wherein the means for organizing comprises a user-editable text file listing supported operating systems.

4. The system of claim 1, wherein the means for organizing comprises separate directories for separate operating systems.

5. The system of claim 4, wherein the means for organizing is capable of moving a file entry from one directory to another directory.

6. The system of claim 4, wherein the separate directories are identified in operating system boot sectors.

7. A boot management system, comprising:
   a computer having a processor and a memory accessible to the processor for holding data and instructions being executed by the processor;
   a user-editable text file describing operating systems and the boot files needed to boot them; and
   a boot management program which compares an original equipment manufacturer field in an operating system boot record with a directory name, whereby the system supports selecting an operating system from among the supported operating systems listed in the text file, loading the selected operating system into the memory and yielding control to it, thereby booting the computer.

8. The system of claim 7, wherein the boot management program supports booting a given operating system in different modes.

9. The system of claim 7, wherein the text file specifies a given operating system more than once and the boot management program supports booting different versions of the given operating system.

10. A boot management system, comprising:
    a computer having a processor and a memory accessible to the processor for holding data and instructions being executed by the processor;
    a user-editable text file describing operating systems and the boot files needed to boot them; and
    a boot management program which writes a directory name in an original equipment manufacturer field in an operating system boot record, whereby the system supports selecting an operating system from among the supported operating systems listed in the text file, loading the selected operating system into the memory and yielding control to it, thereby booting the computer.

11. The system of claim 10, wherein the boot management program supports booting a given operating system in different modes.

12. The system of claim 10, wherein the text file specifies a given operating system more than once and the boot management program supports booting different versions of the given operating system.

13. A boot management system, comprising:
    a computer having a processor and a memory accessible to the processor for holding data and instructions being executed by the processor;
    a user-editable text file describing operating systems and the boot files needed to boot them; and a boot management program which detects a change from a first file system format to a second file system format and then boots an operating system and file system pair that operate using the second file system format, whereby the system supports selecting an operating system from among the supported operating systems listed in the text file, loading the selected operating system into the memory and yielding control to it, thereby booting the computer.

14. The system of claim 13, wherein the boot management program supports booting a given operating system in different modes.

15. The system of claim 13, wherein the text file specifies a given operating system more than once and the boot management program supports booting different versions of the given operating system.

* * * * *